US009123270B1

(12) United States Patent  (10) Patent No.: US 9,123,270 B1
Marcus  (45) Date of Patent: Sep. 1, 2015

(54) DECORATIVE ATTACHMENT FOR VEHICLE REAR-VIEW MIRROR

(71) Applicant: Reflection Band, LLC, Plano, TX (US)

(72) Inventor: Paul Gerard Marcus, Santa Fe, NM (US)

(73) Assignee: Reflection Band, LLC, Plano, TX (US)

( * ) Notice: Subject to any disclaimer, the term of this patent is extended or adjusted under 35 U.S.C. 154(b) by 0 days.

(21) Appl. No.: 14/248,385

(22) Filed: Apr. 9, 2014

(51) Int. Cl.
*G09F 21/00* (2006.01)
*G09F 21/04* (2006.01)
*B60R 1/04* (2006.01)

(52) U.S. Cl.
CPC .. *G09F 21/04* (2013.01); *B60R 1/04* (2013.01)

(58) Field of Classification Search
CPC .................................. G09F 21/04; G09F 1/12
USPC ........... 40/591, 593, 700, 798, 799, 739, 741; 248/442.2
See application file for complete search history.

(56) References Cited

U.S. PATENT DOCUMENTS

| 275,432 | A | * | 4/1883 | Stanly | 40/310 |
|---|---|---|---|---|---|
| 2,194,220 | A | * | 3/1940 | Elder | 40/637 |
| 4,450,636 | A | * | 5/1984 | Lasurdo | 40/799 |
| 5,054,816 | A | * | 10/1991 | Rosengarten | 281/42 |
| 5,133,141 | A | * | 7/1992 | Bane | 40/593 |
| 5,581,925 | A | * | 12/1996 | Snoke et al. | 40/791 |
| 5,890,603 | A | * | 4/1999 | Arguin et al. | 211/45 |
| 6,155,528 | A | * | 12/2000 | Collura | 248/466 |
| 2003/0041488 | A1 | * | 3/2003 | Wu | 40/1.6 |
| 2005/0138854 | A1 | * | 6/2005 | Simmons | 40/665 |
| 2010/0155554 | A1 | * | 6/2010 | Wagenhoffer, Jr. | 248/223.31 |
| 2012/0017480 | A1 | * | 1/2012 | Shtainhorn | 40/745 |
| 2012/0297827 | A1 | * | 11/2012 | Mellinger et al. | 63/33 |

FOREIGN PATENT DOCUMENTS

AU 2002100268 A4 * 5/2002
KR 2008112053 A * 12/2008

* cited by examiner

*Primary Examiner* — Casandra Davis
(74) *Attorney, Agent, or Firm* — Benjamin M. Hanrahan; Hanrahan Law Firm, P.A.

(57) ABSTRACT

A decorative device and/or band for removable attachment to a rear-view mirror is presented herein. Particularly, the band includes an at least partially flexible and resilient mounting component which is removably disposable in an engaged relation around an outer periphery of the vehicle mirror housing. Further, in certain embodiments, the mounting component includes an at least partially closed-loop and/or oval configuration with two oppositely disposed first and second longitudinal portions thereof which at least partially engage opposite upper and lower peripheral surfaces of the vehicle mirror housing. A display panel which in includes indicia (e.g., text, graphics, artwork, logos, etc.) displayed thereon extends outwardly from (e.g., upwardly, downwardly or to one or more sides) at least a portion of the mounting component.

18 Claims, 5 Drawing Sheets

DECORATIVE ATTACHMENT FOR VEHICLE REAR-VIEW MIRROR

FIELD OF THE INVENTION

The present invention is generally directed to a band or other decorative attachment device for removable attachment to a vehicle mirror, such as by wrapping at least partially around, and in some embodiments, completely around, the housing of a vehicle rear-view mirror. As provided herein, the band or attachment device may include a display panel that extends outwardly from the band to display indicia (e.g., text, logos, artwork, or other decorative markings). Other indicia may be provided along the outer portion or surface of the band. When the band is attached to or secured around the vehicle mirror, the indicia provided on the display panel is preferably directed toward the driver, passenger or cabin of the vehicle, although certain embodiments may display the indicia outward, for example, through or toward the windshield.

BACKGROUND OF THE INVENTION

Most passenger vehicles and automobiles, such as cars, trucks, and vans include a rear-view mirror which is designed to allow the driver to see rearward in the mirror through the back window. The rear-view mirror may be affixed to or proximate the windshield, typically at or near the upper central portion of the windshield, although other locations may be possible.

Rear-view mirrors may include various shapes, sizes and/or dimensions. Particularly, some rear-view mirrors may include auxiliary components, such as garage door buttons, panic buttons, dimming buttons, light buttons or switches, etc. The inclusion of such auxiliary components may alter the overall shape and size of the mirror or the mirror housing/frame.

While some drivers may choose to decorate the mirror by hanging objects (e.g., lanyards, necklaces, tassels, etc.) from the stem of mirror mount, such objects may significantly obstruct the driver's vision through certain portions of the windshield and/or at times can swing and distract the driver while operating the vehicle. There exists a need for a decorative attachment to the frame or housing of the mirror which can display custom or selected indicia thereon, such as, but in no way limited to text, logos, graphics, images, artwork, etc. The proposed decorative attachment may be in the form of a flexible, resilient band which can be partially stretched and engagably wrapped around the peripheral surface of the mirror housing or frame.

Furthermore, drivers who use mobile communication devices (e.g., cellular telephones), for example, for composing, sending or reading text messages, email, accessing one or more social networking sites, and other features, while simultaneously operating a vehicle, tend to cause severe and violent traffic accidents as a result of being distracted. Oftentimes, a simple message or reminder displayed to the driver can significantly reduce the likelihood that the driver will text, operate a cellular telephone or engage in activities that can significantly distract the driver while operating the vehicle. Moreover, the message may be displayed proximate, adjacent or in an attached manner to a mirror (such as, but not limited to, a rear-view mirror), such that when the driver looks at or glances toward the mirror, he or she is reminded of the message displayed. In this manner, the indicia or text on the decorative attachment device may include "Don't Text and Drive," "Texting Can Wait," "Put the Phone Down," etc. Of course, other reminders, text, etc. may be used such as "Don't Drink and Drive," as just another example.

SUMMARY OF THE INVENTION

The present invention is generally directed to a band or decorative device structured for removable, yet secure, attachment to a vehicle mirror, including, but not limited to a rear-view mirror commonly disposed within the vehicle proximate the windshield. Particularly, the band includes an at least partially flexible and resilient mounting component which, in certain embodiments is constructed of a silicone rubber, although other materials may be used.

Specifically, the mounting component may be engaged to the mirror housing, for example, by at least partially stretching the band or mounting component around the housing or frame. For instance, in certain embodiments, the mounting component includes an at least partially closed-loop and/or oval configuration with two oppositely disposed first and second longitudinal portions thereof which at least partially engage opposite upper and lower peripheral surfaces of the vehicle mirror housing. Opposite side portions of the band or mounting component will thus engage corresponding sides of the mirror frame. This provides the secure attachment or engagement around the outer periphery of the mirror, although other attachments may be contemplated, such as adhesion, or partial wrapping around the frame. Accordingly, the attachment device or band of the present invention may be universally constructed to removably engage any mirror of any vehicle or automobile, including, but not limited to compact vehicles, sub-compact vehicles, sports cars, hybrid vehicles, economy sized vehicles, small-size vehicles, mid-size vehicles, full-size vehicles, sedans, luxury vehicles, exotic vehicles, antique vehicles, crossovers, jeeps, mini vans, full-size vans, sport utility vehicles (SUV), light trucks, full-size trucks, etc.

Furthermore, a display panel which in includes indicia (e.g., text, graphics, artwork, logos, etc.) displayed thereon extends outwardly from (e.g., upwardly, downwardly or to one or more sides) at least a portion of the mounting component. The indicia may be fully customized and can include any text, graphics, artwork, images, logos, drawings, protrusions, dimples, engravings, color(s), font(s), etc. Further, the indicia may be disposed onto the display area or panel or other portions of the band or attachment device in virtually any manner, including, for example, via one or more stickers, etching, printing, engraving, laser engraving, embossing, colored embossing, heat sealed screen printing, raised indicia, ink printing, standard screen printing, pad or transfer printing, de-bossing in the mold, de-bossing in the mold and ink filled, etc.

Furthermore, the display area or panel may be positioned adjacent any portion or surface of the mirror, for example, adjacent or along an upper longitudinal surface or lower longitudinal surface. It should be noted that the display panel or area may also extend or be positioned at least partially along the sides, as desired. Certain embodiments also include a "reversible" configuration, in that the user may selectively dispose a single band in various positions, for example, so that the display panel is above and/or below the mirror. In this regard, if the indicia contains text, logos or other indicia which requires proper upright orientation, the indicia may be disposed on opposite sides of the display panel in up-side-down orientations to allow proper selective positioning about the mirror.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

As shown in the accompanying drawings, the present invention is directed to a band or other like attachment device, generally referenced as 10, configured for removable attachment to a vehicle mirror 50, including, for example, a rear-view mirror commonly found in the interior cabin of a vehicle. As provided herein, the various embodiments of the band or attachment device 10 of the present invention comprises a mounting component 20 for removable connection or attachment to the mirror 50, for example at least partially around an outer periphery or outer circumferential portion of the mirror housing or frame 60. As provided in further detail herein, a display area or panel 30 may also be included for displaying indicia 40 thereon.

Figure 3:
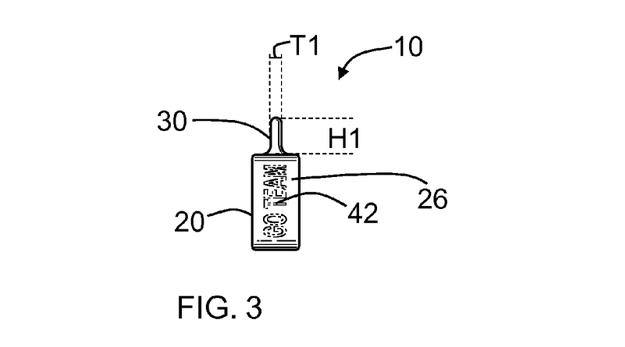
FIG. 3 is a left side view of the embodiment illustrated in FIGS. 1 and 2.
Figure 6:
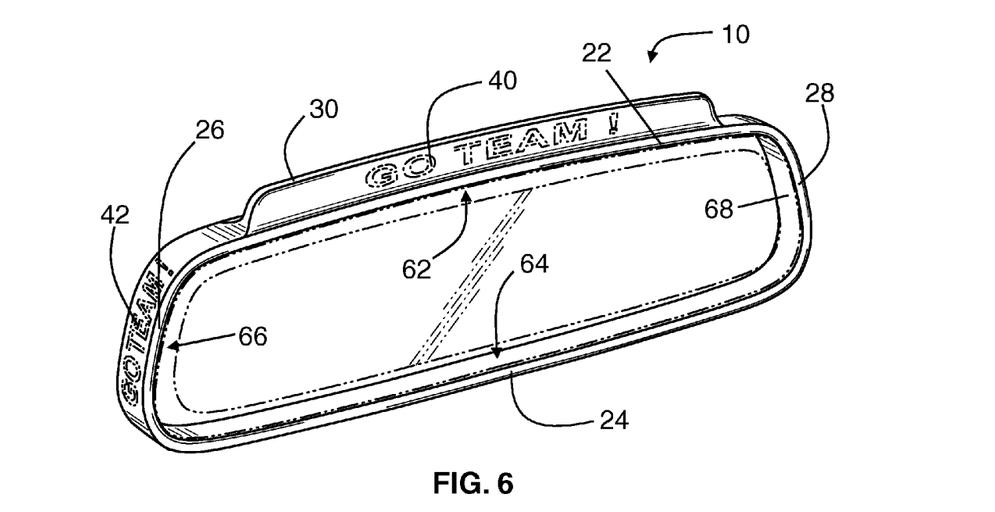
FIG. 6 is a perspective view of the embodiment shown in FIG. 5.

As should be apparent from the description provided herein, the indicia 40 may include, but is certainly not limited to, various forms of text, images, logos, artwork, designs, etc. As just an example, the indicia 40 may include sports team logos or spirit text, reminders, inspirational or motivational phrases or images, etc. For instance, the text "Go Team!" is provided on the attached drawings simply for exemplary purposes and should not be construed as limiting in any manner. As another example, the text or indicia 40 may include reminders or instructions such as "Don't Text and Drive," "Texting Can Wait," "Don't Drink and Drive," etc. Furthermore, certain embodiments may also include indicia 42 on other portions of the band or attachment device 10, such as, for example, along an outer peripheral portion(s), surface(s), or edges(s) of the mounting component 20, as generally illustrated in FIGS. 3, 4 and 6.

Further, the indicia 40 may be disposed onto the display area or panel 30, mounting component 20 or other portions of the band or attachment device 10 in virtually any manner, including, but in no way limited to, via stickers or adhesive layers, printing, engraving, laser engraving, embossing, colored embossing, heat sealed screen printing, raised indicia, ink printing, standard screen printing, pad or transfer printing, de-bossing in the mold, de-bossing in the mold and ink filled, etc. Further embodiments may include coating the outside of the display panel 30 or other portions of the band 10 with an alternative color ink and engraving (e.g., laser engraving) the indicia 40 to reveal the color of the lower or under layer. Of course, other methods for disposing the indicia 40 on the display panel 30, mounting component 20 or other portions of the band 10 may be implemented.

Figure 1:
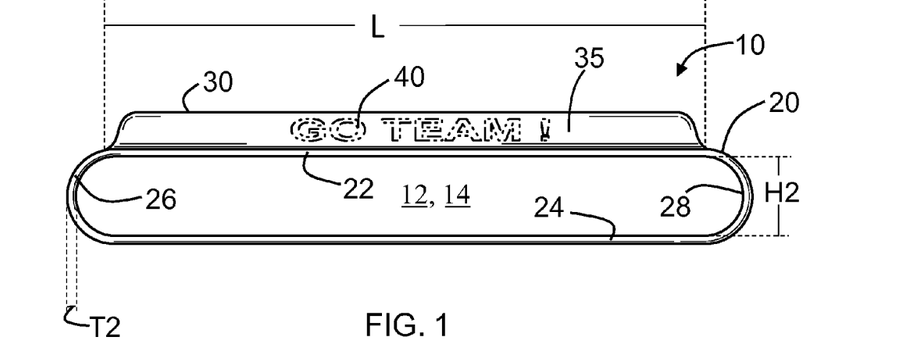
FIG. 1 is a front view of the decorative attachment device disclosed in accordance with at least one embodiment of the present invention provided herein.
Figure 2:
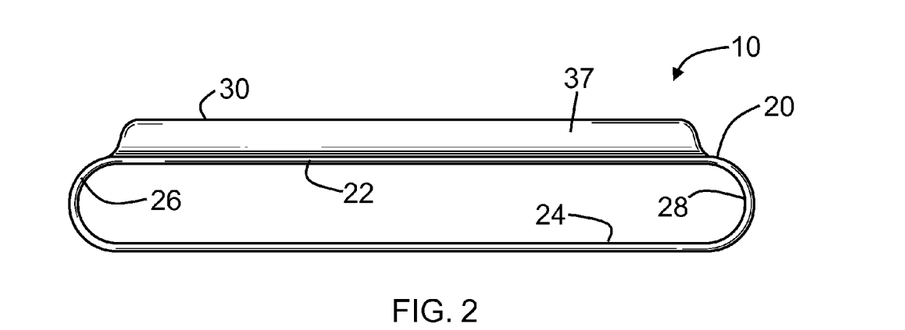
FIG. 2 is a rear view of the embodiment illustrated in FIG. 1.
Figure 4:
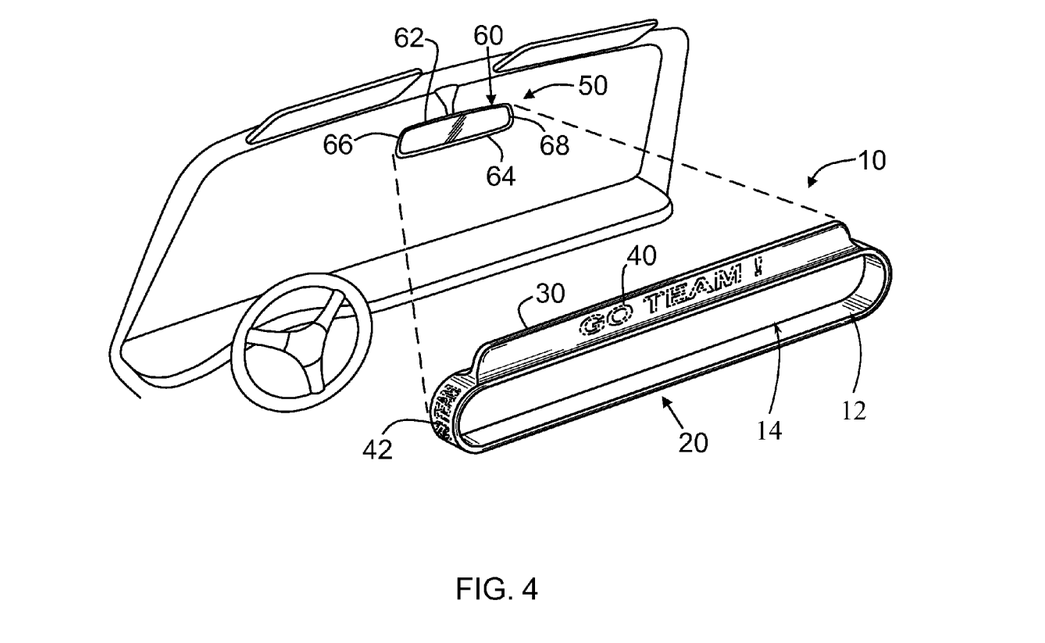
FIG. 4 is an exploded view illustrating the embodiment shown in FIGS. 1, 2 and 3 attachable to a rear-view mirror housing.

Referring to the embodiment illustrated in FIGS. 1 through 6, the mounting component or band 20 of the attachment device 10 may include a closed-loop configuration, generally in the form of an oval, for example, for removable attachment about an exterior peripheral surface, frame or housing 60 of a vehicle minor 50. As shown in FIGS. 1 and 4, for example, the mounting component or band 20 of one embodiment includes an open interior defined by oppositely disposed open portions or ends 12, 14. In this regard, as will be apparent from the description provided herein, at least one embodiment of the mounting component 20 is configured to wrap around the exterior peripheral surfaces of the mirror 50 or mirror frame 60, for instance, along a top or upper longitudinal surface 62, sides 66, 68, and along the lower longitudinal surface 64. It should be noted, however, that other embodiments, not illustrated, may include open configurations or at least partially open configurations (for example, in the form of a "C" or other like shape) such that the mounting component 20 may be disposed partially around the mirror 50, for example, around a top longitudinal surface 62, along one or both sides 66, 68, and perhaps partially along the bottom or lower longitudinal surface 64.

More in particular, the mounting component 20 of certain embodiments, for instance, the embodiment illustrated in FIGS. 1 through 6, comprises a flexible construction and may further include an elasticity or resiliency for facilitating wrapping the mounting component 20 or band 10 at least partially around the mirror 50 or mirror housing 60. In this regard, the band 10, and in particular, the mounting component 20 thereof, of at least one embodiment of the present invention may be configured to at least partially conform to or otherwise securely, yet removably, attach to virtually any vehicle mirror 50, regardless of shape or size. For instance, some mirrors 50 may include additional auxiliary components (e.g., garage door buttons) extending therefrom, such that certain surfaces, such as the lower longitudinal surface 64 is not straight or perfectly linear. In this manner, the mirror 50 or mirror housing 60 may include an odd or non-uniform shape or size. Accordingly, the mounting component 20 of at least one embodiment comprises sufficient flexibility, resiliency and/or elasticity to at least partially conform to and securely attach to mirrors 50 of various shapes and sizes. Thus, the attachment device 10 of the present invention, and particularly, the mounting component 20 thereof, may fit or otherwise be attached to a mirror 50 (such as a rear-view mirror) of virtually any vehicle or automobile, including, but not limited to compact vehicles, sub-compact vehicles, sports cars, hybrid vehicles, economy sized vehicles, small-size vehicles, mid-size vehicles, full-size vehicles, sedans, luxury vehicles, exotic vehicles, antique vehicles, crossovers, jeeps, mini vans, full-size vans, sport utility vehicles (SUV), light trucks, full-size trucks, etc.

Certain embodiments of the present invention further include a display panel 30 extending outwardly from at least a portion of the mounting component 20, and thus, extending outwardly from the mirror 50 when the mounting component 20 is attached to the mirror 50 or mirror housing 60. For example, as shown in the exemplary embodiment of FIGS. 1 through 6, the display panel 30 extends from and is disposed along at least one of the longitudinal portions or surfaces, such as the first longitudinal portion, represented as reference character 22, of the mounting component 20. Particularly, the display panel 30 of at least one embodiment may comprise a generally elongated or planar configuration configured to extend at least partially or, in some cases, substantially along the length of the longitudinal portion 22 such that when the band or attachment device 10 is connected or attached to the mirror 50, the display panel 30 is disposed along a corresponding longitudinal surface 62 of the mirror housing 60.

Figure 5:
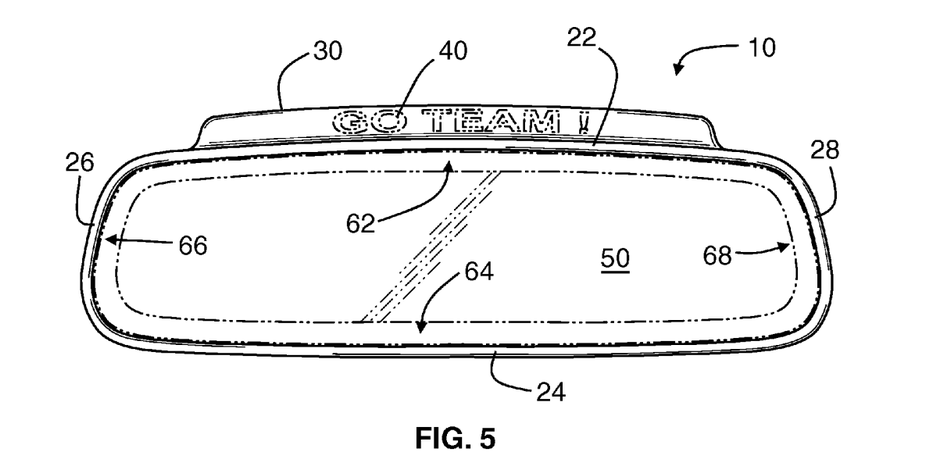
FIG. 5 is a front view of the embodiment illustrated in FIGS. 1 through 4 removably attached to a rear-view mirror housing.

For instance, indicia 40 of the embodiment illustrated in FIGS. 1 through 5 include the graphics or text "Go Team!" on a first face 35 of the display panel 30 such that the indicia 40 must be oriented in a particular upright direction for proper reading. In the illustrated embodiment of FIGS. 1 through 6, and particularly as shown in FIGS. 5 and 6, the "Go Team!" or other written indicia 40 may be oriented such that the display panel 30 is disposed along a first or upper longitudinal portion 62 of the mirror frame or housing 60. As will be described in accordance with other embodiments, however, other orientations and positions may be contemplated and are within the full spirit and scope of the present invention.

Further, still referring to the exemplary embodiment illustrated in FIGS. 1 through 6, and particularly as shown in FIGS. 4, 5, and 6, the indicia 40 is oriented inward or toward the inside of the cabin of the vehicle such that the driver and/or passenger(s) can readily view the contents or indicia 40 disposed on the display panel 30. In this regard, the first face 35 of the display panel 30, which includes the indicia 40 thereon, may face inward, and the oppositely disposed second face 37 of the display panel 30 may face or be oriented outward, or toward the vehicle windshield. Of course, if desired, the band or attachment device 10 of the present invention may be attached or connected to the mirror 50 or mirror housing 60 in a manner such that the indicia 40 and/or first face 35 faces outward toward the vehicle windshield. Moreover, indicia 40 may be disposed or displayed on either the first face 35, second face 37, or both.

It should also be noted that the display panel 30 of the various embodiments disclosed herein may be configured in different shapes and sizes, and may be disposed along various portions of the mounting component. For instance, the display panel 30 may include a generally elongated configuration disposed substantially along the length of one or more of the longitudinal portions 22, 24 of the mounting component, and may further include a generally planar first or second face 35, 37, as illustrated. However, the display panel 30 of other embodiments may be configured in virtually any shape or size, whether uniform, non-uniform, rectangular, curved, wavy, etc., and may include, but is in no way limited to, generally flat or planar faces 35, 37 for displaying the indicia 40. For instance, the faces 35, 37 of the display panel 30 may include any shape, may include bulges, bumps, dimples, protrusions, etc.

For exemplary purposes only, certain embodiments of the display panel 30 may include a length L of between seven (7) and nine (9) inches, such as 8 inches from the farthest tips or ends as illustrated in FIG. 1. Of course, other lengths outside of this range, including as low as or lower than one (1) inch and greater than nine (9) inches are certainly contemplated and within the scope of the present invention. Further, the height H1 of the display panel 30, as illustrated in FIG. 1, may be less than one (1) inch, and approximately one-half (½) of an inch, although other dimensions greater or lower than this range are contemplated. Finally, the thickness T1 of the display panel 30 of one exemplary embodiment, measured from the first face 35 to the second face 37, may be in the range of about 0.125 inches, although other dimensions greater or lower are contemplated.

Referring now to the mounting component 20 of at least one embodiment, as illustrated in FIG. 1, the height H2, when at rest or otherwise not stretched or disposed in a connected relation to a mirror 50 or mirror housing 60, may include a dimension of approximately one (1) inch or slightly greater than one (1) inch, although other dimensions are within the scope of the present invention. Further, the thickness of the wall, represented as T2, may be approximately one (1) inch or slightly less than one (1) inch (e.g., 0.938 inches), although other dimensions may be implemented. Moreover, as certain embodiments may include a closed-loop configuration, the circumference of the mounting component may be approximately twenty (20) inches, or slightly less than twenty (20) inches, although other circumferences greater or lower than this amount may be contemplated. Furthermore, as shown in FIG. 3, the width W of the mounting component 30 may be in the range of approximately one-half (½) inch to one (1) inch, such as about 0.625 inches, although other widths or dimensions are within the scope of the present invention.

It should also be noted that, for exemplary purposes only, certain implementations of the band or attachment device 10 of the present invention may be constructed or formed from a flexible and resilient material, such as, but certainly not limited to, silicone rubber, which can be at least partially stretched, expanded and wrapped around or otherwise secured to the mirror 50, as described herein. For instance, the material of the band 10, and in particular the mounting component 20 thereof, may comprise an elongation strain of greater than one hundred and fifty percent (150%), and in some embodiments may be approximately two hundred percent (200%). For instance, the elongation strain may be referred to as the amount of strain the device can experience before failure in tensile testing. Of course, other elongation strains lower than one-hundred and fifty percent (150%) and greater than two hundred percent (200%) may also be implemented within the full spirit and scope of the various embodiments of the present invention.

Furthermore, and again for exemplary purposes only, the hardness of the material used to construct the band 10 and in particular the mounting component thereof, may be approximately less than or equal to Shore A 30. Of course, the hardness of the material may be greater or less than this amount in certain implementations.

It should also be noted that the material, such as, but not limited to the silicone rubber material, may be UV protection grade and be capable of withstanding temperatures up to 450 degree Fahrenheit. For instance, because the device 10 of certain embodiments may be placed around the rear-view mirror 50 inside a vehicle cabin, the device 10 will likely experience or otherwise be exposed to high temperatures and, in some cases, may be exposed to direct UV light.

Moreover, in certain embodiments, the display panel 30 and the mounting component 20 may be constructed from a single piece, such that they may be manufactured from a single silicone rubber or other mold, and are therefore fixedly attached to one another. This facilitates ease of construction as well as increased durability.

Figure 7A:
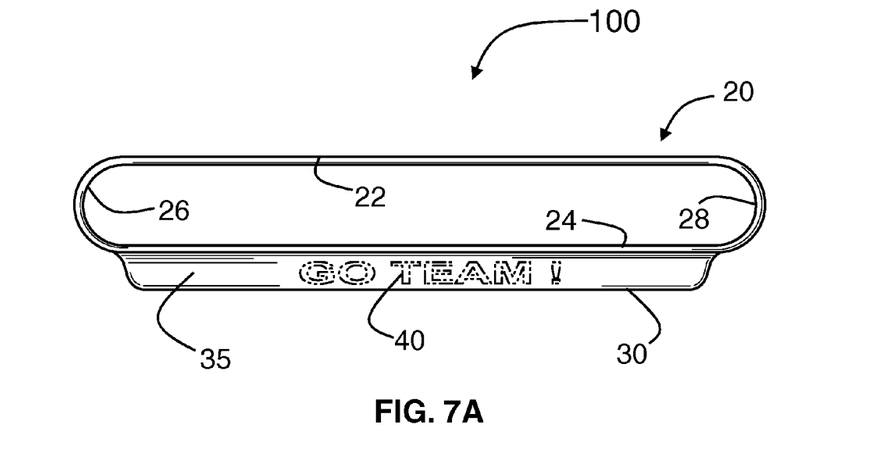
FIG. 7A is a front view of the decorative attachment device disclosed in accordance with another embodiment of the present invention.
Figure 7B:
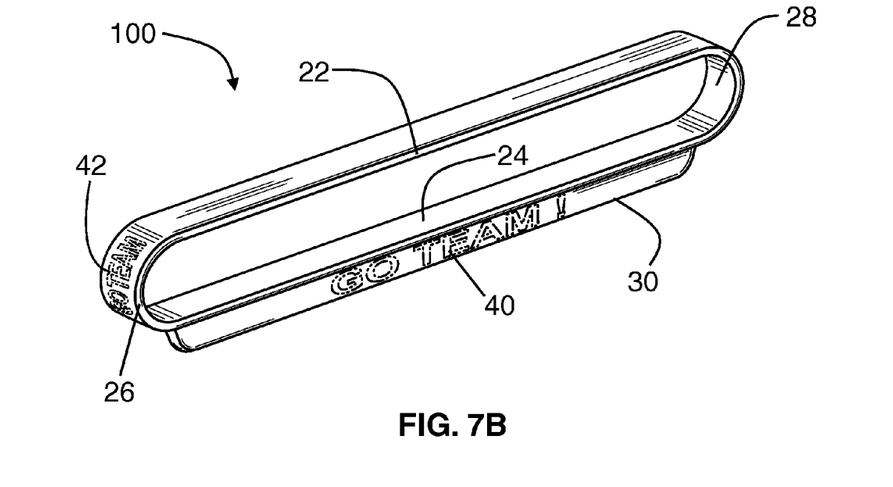
FIG. 7B is a perspective view of the embodiment illustrated in FIG. 7A.

Referring now to the embodiment of the band or attachment device 100 illustrated in FIGS. 7A and 7B, the display area or panel 30 may be positioned along a length of the second longitudinal portion 24 of the mounting component 20. In this manner, when disposed in a connected or mounted relation to a mirror or mirror housing, as described herein, the display panel 30 may be positioned beneath the mirror 50, such as, along the second or lower longitudinal portion or surface 64 of the mirror housing 60.

Of course, as described above, the indicia 40, 42 need not include text or other indicia that requires proper upright orientation for proper reading, and thus, in cases where the indicia 40, 42 includes artwork or other graphics, for example, the same band or attachment device 10, 100 may be selectively oriented, as desired. Further, the display panel 30 need not be disposed along the first or second longitudinal portions 22, 24, and may instead or in addition be disposed anywhere along the band 10, 100, including at least partially along the sides 26, 28 thereof.

Figure 8A:
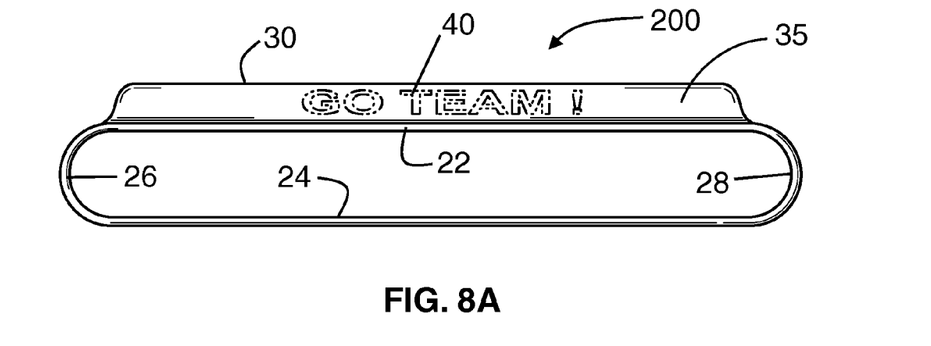
FIG. 8A is a front view of yet another embodiment of the decorative attachment device disclosed herein.
Figure 8B:
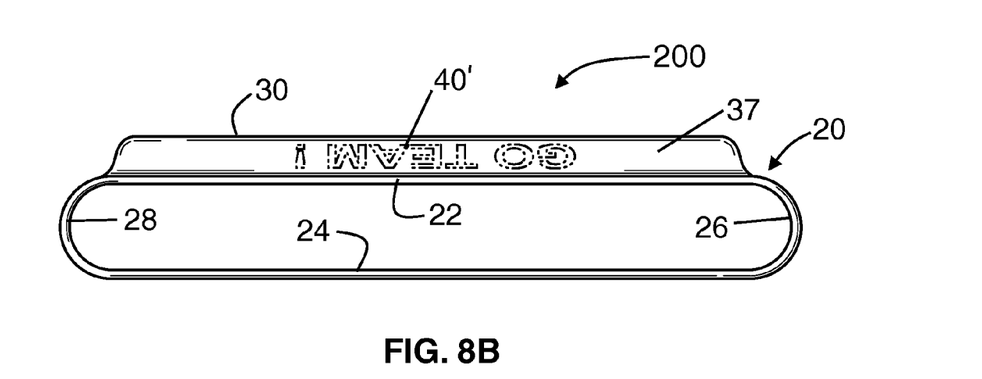
FIG. 8B is a rear view of the illustration shown in FIG. 8A.
Figure 8C:
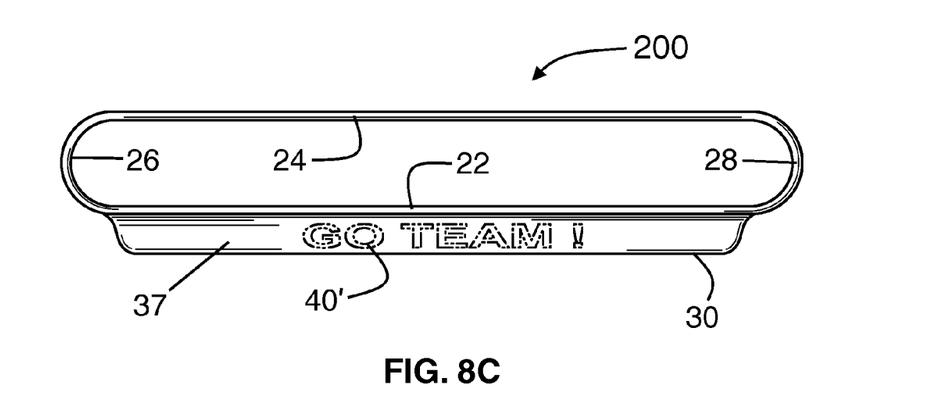
FIG. 8C is a rear view of the embodiment shown in FIG. 8A, and rotated 180 degrees.

FIGS. 8A, 8B and 8C illustrate yet another exemplary embodiment of the band or attachment device 200 of the present invention. Particularly, in this embodiment, the device 200 may be "reversible" in that the display panel 30 may include first and second oppositely disposed display sides or faces 35, 37.

In this regard, the same band or attachment device 200 may be "reversed" or selectively flipped around such that the display panel 30 is positioned along the top of the mirror (position shown in FIG. 8A, mirror not shown), or positioned along the bottom of the mirror (position shown in FIG. 8C). For instance, in the exemplary embodiment of the band 200 illustrated, in FIGS. 8A, 8B and 8C, the indicia 40, 40' text "Go Team!" may be displayed in opposite (up-side-down) orientations on opposite first and second sides 35, 37 of the display panel 30 in order to allow a user to simply flip the band or device 200 over in order to selectively orient the location of the display panel 30 relative to the mirror. Of course, the indicia 40, 40' need not be limited to text, and can therefore include images, graphics, etc. and may not need to be displayed in opposite (up-side-down) orientations on opposite sides of the display panel 30 in order to facilitate the "reversible" feature described herein.

This written description provides an illustrative explanation and/or account of the present invention. It may be possible to deliver equivalent benefits and insights using variations of the sequence, steps, specific embodiments and methods, without departing from the inventive concept. This description and these drawings, therefore, are to be regarded as illustrative and not restrictive.

Now that the invention has been described,

What is claimed is:

1. A decorative device for removable attachment to a vehicle rear-view mirror housing disposed within an interior cabin of a vehicle, said decorative device comprising:
    an at least partially flexible mounting band comprising a substantially elongated configuration with oppositely disposed longitudinal portions and an open interior, said open interior being defined by oppositely disposed open front and rear ends,
    a display panel extending outwardly from a portion of said mounting band,
    said display panel being disposed along a length of said portion of said mounting band, wherein at least a substantial portion of said display panel is inwardly offset from and substantially parallel to an adjacent peripheral edge of said mounting band,
    said display panel comprising indicia disposed thereon for display,
    wherein said at least partially flexible mounting band and said display panel collectively comprise a one-piece construction, and
    said mounting band being removably disposable at least partially around an outer periphery of the vehicle mirror housing, wherein said display panel is viewable from a position within the interior cabin of the vehicle.

2. The decorative device as recited in claim 1 wherein said mounting band comprises a closed-loop configuration for removable engagement around the outer periphery of the vehicle mirror housing.

3. The decorative device as recited in claim 2 wherein said display panel is disposed at least partially along at least one of said oppositely disposed longitudinal portions of said mounting band.

4. The decorative device as recited in claim 3 wherein said display panel is disposed substantially along said at least one of said oppositely disposed longitudinal portions of said mounting band.

5. The decorative device as recited in claim 4 wherein said display panel is positioned adjacent an upper longitudinal portion of the vehicle mirror housing when said mounting band is disposed in an engaged relation at least partially around the outer periphery of the vehicle mirror housing.

6. The decorative device as recited in claim 4 wherein said display panel is positioned adjacent a lower longitudinal portion of the vehicle mirror housing when said mounting band is disposed in an engaged relation at least partially around the outer periphery of the vehicle mirror housing.

7. The decorative device as recited in claim 1 wherein said display panel comprises a planar face for displaying said indicia thereon.

8. The decorative display device as recited in claim 1 wherein said display panel comprises a height greater than one-fourth of an inch.

9. The decorative display device as recited in claim 8 wherein said display panel comprises a height of about one-half of an inch.

10. The decorative device as recited in claim 1 wherein said mounting band comprises silicone rubber.

11. The decorative device as recited in claim 10 wherein said mounting band comprises an elongation strain of greater than one hundred and fifty percent (150%).

12. The decorative device as recited in claim 11 wherein said mounting band comprises an elongation strain of approximately two hundred percent (200%).

13. The decorative device as recited in claim 1 wherein said mounting band comprises a hardness of less than or equal to Shore A 30.

14. A decorative device for removable attachment to a vehicle rear-view mirror housing disposed within an interior cabin of a vehicle, said decorative device comprising:
    an at least partially flexible and resilient mounting band,
    said mounting band comprising a substantially elongated closed-loop configuration comprising oppositely disposed longitudinal portions at least partially engagably disposable on opposite upper and lower longitudinal surfaces of the vehicle mirror housing,
    an outwardly extending display panel disposed along a length of at least one of said oppositely disposed longitudinal portions of said mounting band, said display panel comprising indicia disposed thereon,
    wherein said mounting band and said display panel collectively comprise a one-piece construction, said mounting band further comprising additional indicia disposed directly thereon, and said mounting band being selectively disposable at least partially around an outer periphery of the vehicle mirror housing to selectively position said display panel above the upper longitudinal surface of the vehicle mirror housing or below the lower longitudinal surface of the vehicle mirror housing.

15. The decorative device as recited in claim 14 wherein said display panel extends outwardly from said mounting band a distance less than or substantially equal to one inch.

16. The decorative device as recited in claim 15 wherein said mounting band is further selectively disposable at least partially around the outer periphery of the vehicle mirror housing to selectively orient said indicia of said display panel inward toward the interior of the cabin of the vehicle or outward toward a windshield of the vehicle.

17. A decorative device for removable attachment to a vehicle rear-view mirror housing disposed within an interior cabin of a vehicle, said decorative device comprising:

an at least partially flexible mounting band comprising an at least partially elongated configuration with an open interior for disposition at least partially around an outer periphery of the vehicle rear-view mirror housing, at least one display panel extending outwardly from and disposed along a length of at least a portion of said mounting band, wherein said outwardly extending display panel and said mounting band collectively comprise a one-piece construction, wherein said at least one outwardly extending display panel further comprises an indicia portion with indicia disposed thereon, said indicia portion being inwardly offset from and substantially parallel to an adjacent peripheral edge of said mounting band, and wherein said mounting band further comprises additional indicia disposed directly thereon.

18. The device as recited in claim 17 wherein said display panel extends outwardly from said mounting band a distance less than or substantially equal to one inch.

\* \* \* \* \*